United States Patent
Jang et al.

(10) Patent No.: US 8,498,494 B2
(45) Date of Patent: Jul. 30, 2013

(54) METHOD AND APPARATUS FOR PROCESSING A DIGITAL IMAGE SIGNAL, AND A RECORDING MEDIUM HAVING RECORDED THEREON A PROGRAM FOR EXECUTING THE METHOD

(75) Inventors: Soon-geun Jang, Suwon-si (KR); Eun-sun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1029 days.

(21) Appl. No.: 12/535,791

(22) Filed: Aug. 5, 2009

(65) Prior Publication Data

US 2010/0034482 A1 Feb. 11, 2010

(30) Foreign Application Priority Data

Aug. 6, 2008 (KR) .................. 10-2008-0077052

(51) Int. Cl.
*G06T 11/20* (2006.01)
(52) U.S. Cl.
USPC ........... 382/274; 382/255; 382/266; 382/270; 382/275; 382/294; 348/345
(58) Field of Classification Search
CPC ......... G06T 5/001; G06T 7/0024; G06T 11/20; H04N 5/23212
USPC ................ 382/255, 266, 270, 272, 275, 276, 382/274, 294; 348/345
See application file for complete search history.

(56) References Cited

U.S. PATENT DOCUMENTS

| | | | | |
|---|---|---|---|---|
| 7,903,897 | B2* | 3/2011 | Komatsu et al. | 382/254 |
| 8,131,104 | B2* | 3/2012 | Arici et al. | 382/268 |
| 2002/0154829 | A1* | 10/2002 | Tsukioka | 382/254 |
| 2003/0169346 | A1* | 9/2003 | Ojima et al. | 348/207.99 |
| 2004/0234153 | A1* | 11/2004 | Nakami | 382/254 |

* cited by examiner

*Primary Examiner* — Matthew Bella
*Assistant Examiner* — Jose M Torres
(74) *Attorney, Agent, or Firm* — Drinker Biddle & Reath LLP

(57) ABSTRACT

A method and apparatus for processing a digital image signal to correct for the effect of hand tremble in a digital photographing apparatus, such as a digital camera or video recorder. The method and apparatus perform the operations of generating original image data, dividing the original image data into at least one block and generating processed image data in which an average of the original image data is calculated according to the block, and decreasing a first contribution of the original image data or increasing a second contribution of the processed image data, as a difference of pixels or blocks between the original image data and the processed image data nears to a boundary.

20 Claims, 9 Drawing Sheets

METHOD AND APPARATUS FOR PROCESSING A DIGITAL IMAGE SIGNAL, AND A RECORDING MEDIUM HAVING RECORDED THEREON A PROGRAM FOR EXECUTING THE METHOD

CROSS-REFERENCE TO RELATED PATENT APPLICATION

This application claims the benefit of Korean Patent Application No. 10-2008-0077052, filed on Aug. 6, 2008, in the Korean Intellectual Property Office, the entire content of which is incorporated herein by reference.

BACKGROUND OF THE INVENTION

1. Field of the Invention

The present invention relates to a method of controlling an apparatus for processing a digital image signal to correct for the effect of hand tremble on, for example, a digital camera or digital video recorder, and a digital image signal processing apparatus for performing the method.

2. Description of the Related Art

Methods of correcting for the effect of hand tremble may be mechanical or electrical. An electrical method of correcting for the effect of hand tremble corrects hand tremble by generating a clear image with reduced noise by capturing and composing an image of short exposure and an image of long exposure. However, according to such an electrical method, two images must be captured, and thus, a time taken to correct for the effect of hand tremble is long. Moreover, since the image of long exposure needs to be captured, it takes a long time to generate a final image.

SUMMARY OF THE INVENTION

The present invention provides an apparatus for processing a digital image signal, which captures one image and corrects for the effect of hand tremble by using the captured image, a method of controlling the apparatus, and a recording medium having recorded thereon a program for executing the method.

Accordingly, an embodiment of the present invention provides a method and apparatus for processing a digital image signal. The method and apparatus perform the operations of generating original image data, dividing the original image data into at least one block and generating processed image data in which an average of the original image data is calculated according to the block, and decreasing a first contribution of the original image data or increasing a second contribution of the processed image data, as a difference of pixels or blocks between the original image data and the processed image data nears to a boundary.

Another embodiment of the present invention provides a method and apparatus for processing a digital image signal. The method and apparatus perform the operations of generating original image data, dividing the original image data into at least one block and generating processed image data in which an average of the original image data is calculated according to the block, and decreasing a first contribution of the original image data or increasing a second contribution of the processed image data, as a difference of pixels or blocks between the original image data and the processed image data nears to a boundary.

The first contribution of the original image data may be decreased and the second contribution of the processed image data may be increased, as the difference of the original image data and the processed image data nears to the boundary. Also, the first contribution of the original image data may be decreased and the second contribution of the processed image data may be increased, when the difference of the original image data and the processed image data is larger than the boundary and as the difference nears to the boundary. When the difference is smaller than the boundary, the second contribution can be established to be larger than the first contribution. The method and apparatus further may perform the operation of deriving the boundary corresponding to a sensitivity that generated the original image data from a database of boundaries according to sensitivity.

In addition, the apparatus and method may further perform the operations of generating first image data indicating a first image, generating second image data indicating a second image inputted at the same sensitivity as a sensitivity that generated the first image data, deriving a difference of pixels or blocks between the first image data and the second image data, deriving a distribution of the difference; deriving a boundary of a certain confidence interval from the distribution of the difference, and deriving the database of boundaries according to sensitivity by performing the above operations while differentiating a sensitivity. The boundary may be the maximum boundary of a certain confidence interval. In the database, a boundary may increase as the sensitivity increases. Also, the method and apparatus may further perform the operations of inputting a capture signal, and generating the original image data by using the capture signal.

Another embodiment of the present invention provides a computer readable recording medium having recorded thereon a program for executing the methods described above.

A further embodiment of the present invention provides an apparatus for processing a digital image signal. The apparatus includes an original image data storage unit which stores original image data, a processed image data generator which divides the original image data into at least one block and generates processed image data in which an average of the original image data is calculated according to the block, and a difference deriver which derives a difference of pixels or blocks between the original image data and the processed image data. The apparatus further includes a contribution determiner which determines a first contribution of the original image data or a second contribution of the processed image data by comparing the difference and a boundary, and a synthesizer which synthesizes the original image data and the processed image data according to the determined first or second contribution.

The apparatus may further include a database storage unit which stores database of boundaries according to sensitivity, and a boundary reader which reads a boundary, corresponding to established sensitivity, from the database. The database may be formed by deriving a distribution of a difference of pixels or blocks between first image data indicating a first image and second image data indicating a second image inputted at the same or about the same sensitivity as the sensitivity that generated the first image data, and differentiating sensitivity while deriving a boundary of a certain confidence interval from the distribution.

The boundary may be the maximum boundary of the certain confidence interval. In the database, a boundary may increase as sensitivity increases. The contribution determiner may include a first distribution determiner which decreases the first contribution as the difference nears to the boundary, and may include a second distribution determiner which increases the second contribution as the difference nears to the boundary. When the difference is larger than the boundary, the contribution determiner may include a first contribution determiner which decreases the first contribution as the difference nears to the boundary, and a second contribution determiner which increases the second contribution as the difference nears to the boundary. When the difference is smaller than the boundary, the contribution determiner may establish the second contribution to be larger than the first contribution. The distribution determiner may further comprise a noise area determiner which determines a noise area including a boundary with regards to the difference.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, exemplary embodiments of the present invention will be described more fully with reference to the accompanying drawings.

Figure 1:
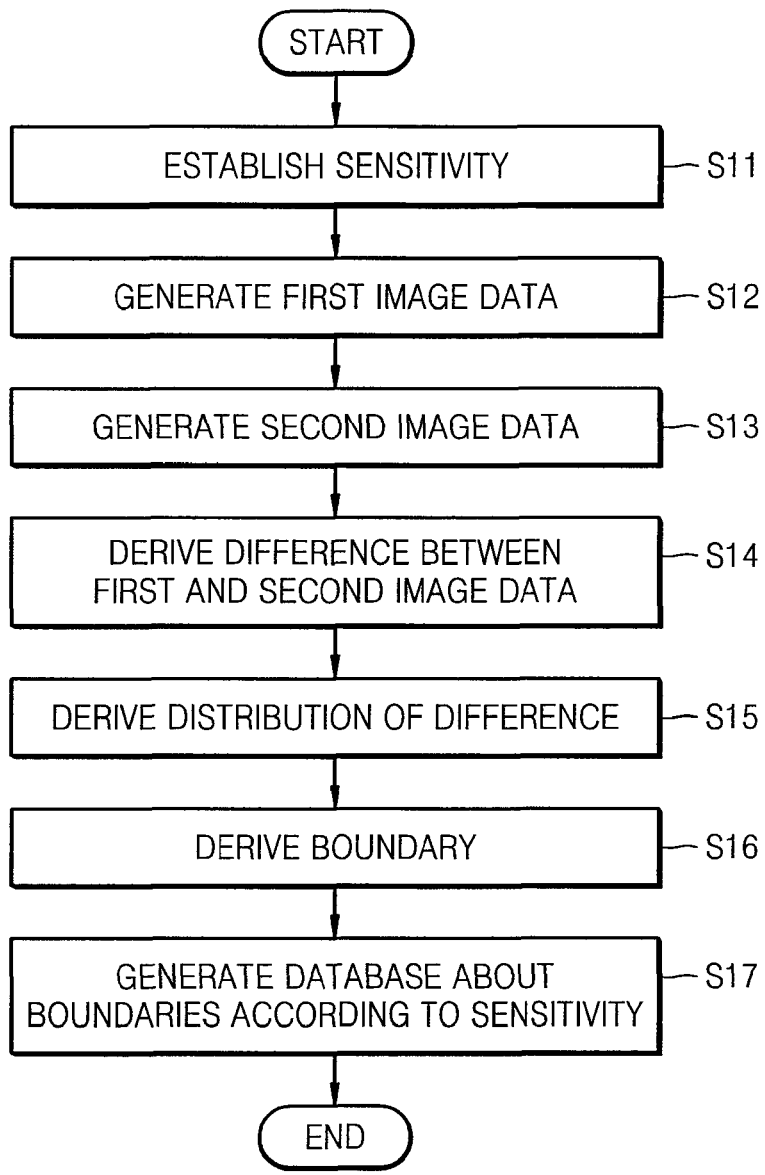
FIG. 1 is a flowchart of an example of a method of forming a database about boundaries according to sensitivity, as a pre-process operation of a method of controlling an apparatus for processing a digital image signal, according to an embodiment of the present invention.

FIG. 1 is a flowchart of a method of forming a database about boundaries according to sensitivity, as a pre-process operation of a method of controlling an apparatus for processing a digital image signal, according to an embodiment of the present invention. The method of FIG. 1 will be described with reference to FIGS. 2 through 4.

Referring to FIG. 1, sensitivity is established in operation S11. In operation S12, first image data indicating a first image is generated under the determined sensitivity. In operation S13, second image data indicating a second image is generated under the determined sensitivity. The first and second images may be captured at a predetermined interval, or inputted in real time in a live-view mode.

Figure 2:
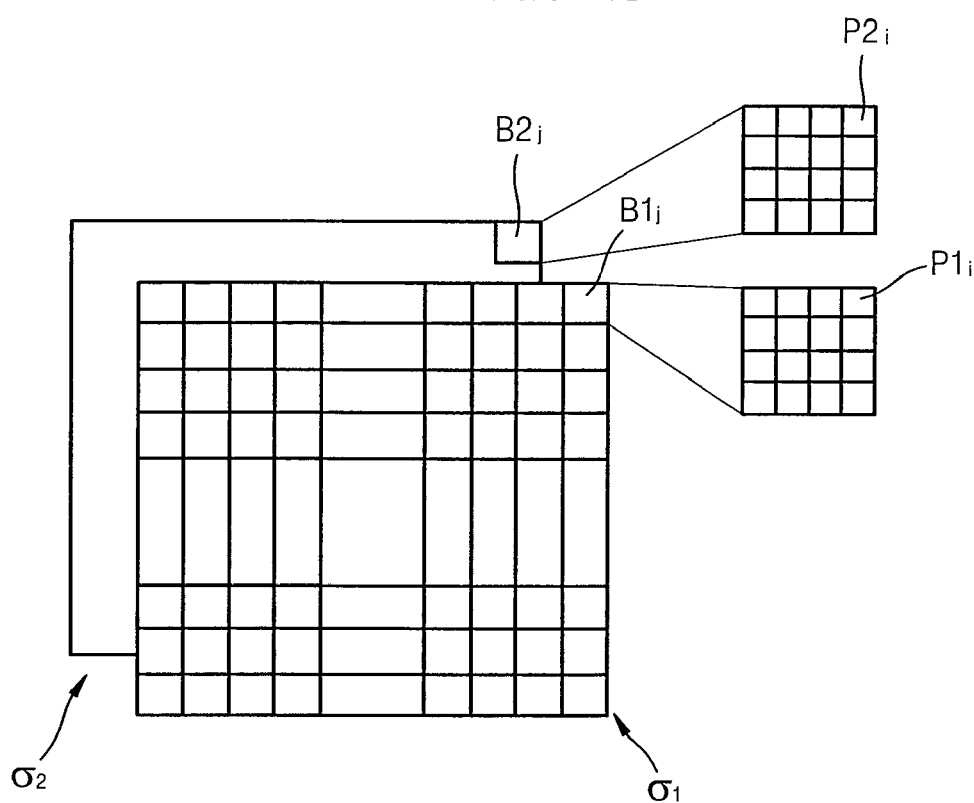
FIGS. 2 through 4 are exemplary diagrams for additionally describing the method illustrated in FIG. 1.

In operation S14, a difference between the first image data and the second image data is derived. Referring to FIG. 2, a first image σ1 and a second image σ2 are obtained, and a difference between the first image σ1 and the second image σ2 is obtained according to pixels. The difference between the first image σ1 and the second image σ2 may be obtained by deriving a pixel value difference of corresponding pixels of the first and second images σ1 and σ2, and squaring the pixel value difference.

Alternatively, the difference may be obtained as indicated in Equation 1 below. The difference obtained according to Equation 1 may be called a sum of squared differences (SSD). The first and second images σ1 and σ2 are divided into a plurality of blocks, pixel value differences of corresponding pixels in the blocks is obtained, the pixel value differences are squared, and then, the squared pixel value differences are added. As such, a difference D1 according to each block is obtained.

$$D_1 = \Sigma(P1_i - P2_i)^2 \quad (1)$$

Here, i denotes a number of pixels in one block.

Figure 3:
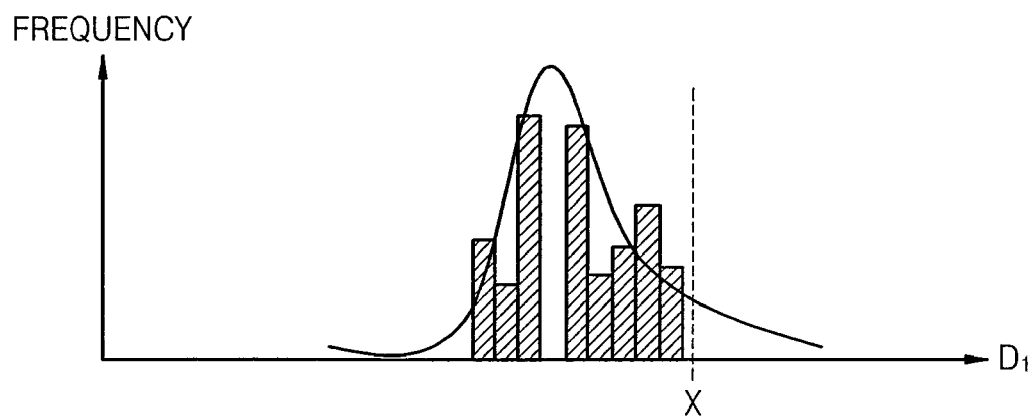

After obtaining the difference D1, a distribution of the difference D1 is derived by displaying the difference D1 in a histogram as shown in FIG. 3, in operation S15. Then, a 95% confidence interval is determined, and the maximum of the 95% confidence interval is determined as a boundary X. Here, it may be determined that the first and second images σ1 and σ2 have a difference according to noise within the 95% confidence interval, and that the first and second images σ1 and σ2 are different images outside the 95% confidence interval. However, the confidence interval is not limited to 95%, and may vary based on rule-of-thumb.

Accordingly after deriving the distribution of the difference D1 as shown in FIG. 3, a boundary of a certain confidence interval is derived from the distribution, in operation S16. In this embodiment, the maximum of the 95% confidence interval is determined as the boundary.

Figure 4:
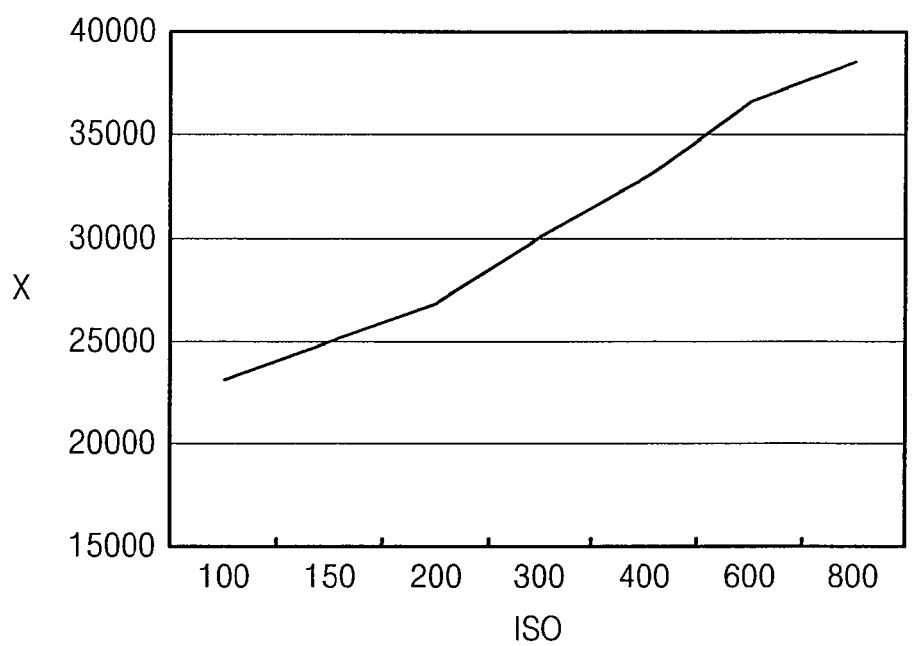

In operation S17, a database about boundaries according to sensitivity is obtained by repeatedly performing operations S11 through S16 while differentiating sensitivity. Accordingly, a database, as illustrated in FIG. 4, may be obtained. Referring to the database of FIG. 4, a boundary X increases according to sensitivity ISO. According to the database, when the boundary X increases, noise components increase, and thus, when the sensitivity ISO increases, the noise components increase.

Accordingly, as the pre-process operation, the database about the boundaries X according to the sensitivity ISO is obtained so as to perform an electronic method of correcting for the effect of hand tremble using one image.

Figure 5:
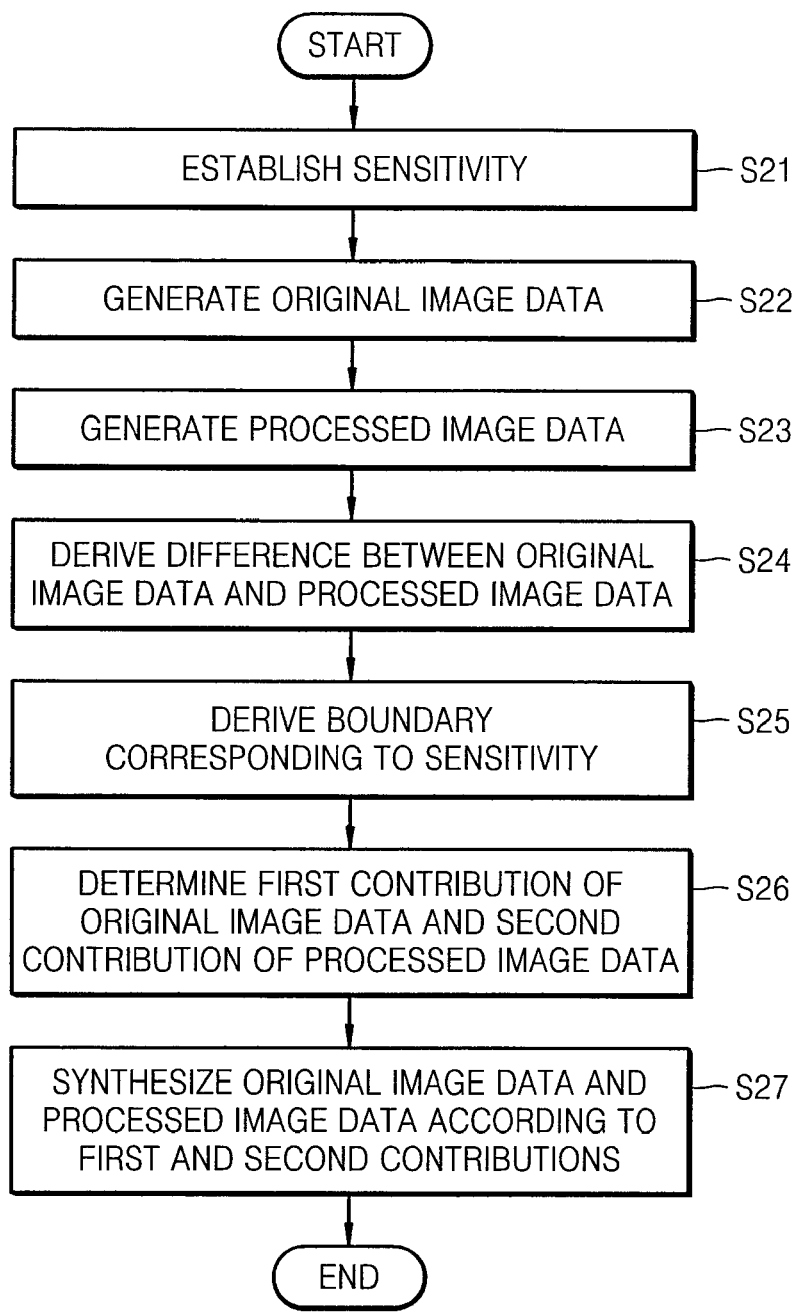
FIG. 5 is a flowchart of an example of an electronic method of correcting for the effect of hand tremble in a method of controlling an apparatus for processing a digital image signal, according to an embodiment of the present invention.

FIG. 5 is a flowchart of an example of an electronic method of correcting for the effect of hand tremble in a method of controlling an apparatus for processing a digital image signal, according to an embodiment of the present invention. The electronic method of FIG. 5 will be described with reference to FIGS. 6 through 8B.

Referring to FIG. 5, sensitivity is established in operation S21. In operation S22, original image data is generated under the established sensitivity by a capture signal. Then, processed image data is generated from the original image data, in operation S23. The processed image data may be generated according to Equation 2 below. Also, the processed image data is generated by performing edge-preserving low-pass filtering (LPF) on the original image data.

$$Js = \frac{\sum_{P \in \Omega} f(p-s) I_p}{\sum_{P \in \Omega} f(p-s)} \quad (2)$$

Here, f denotes a spatial weight function, Ip denotes the original image data, and Js denotes the processed image data. Also, f(p−s) denotes a low pass filter at a spatial axis, and has larger weight when spatially closer to a pixel that is to be filtered.

Figure 6:
FIGS. 6 through 8B are exemplary diagrams for additionally describing the electronic method illustrated in FIG. 5.
Figure 7:
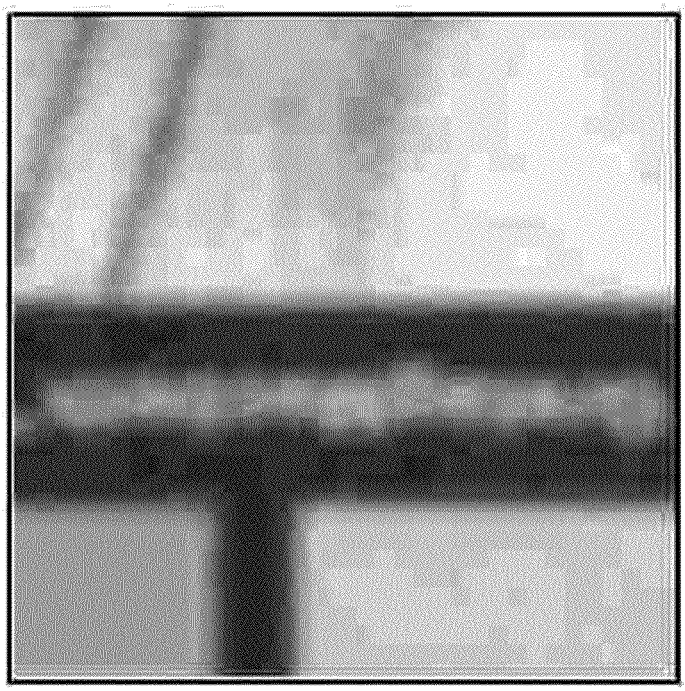

For example, when a first image corresponding to the original image data is as illustrated in FIG. 6, a second image corresponding to the processed image data obtained by performing edge-preserving LFP on the original image data is as illustrated in FIG. 7. As can be seen, edge parts of the second image are smoothen, and thus, the second image is very blurred.

In operation S24, a difference between the original image data and the processed image data is derived. Here, the difference may be derived by using the same method as deriving the difference between the first and second images σ1 and σ2 of FIG. 1. The difference obtained in operation S24 is denoted as D2, and may be obtained according to pixels or blocks. A spare of pixel value differences of the corresponding pixels may be used as the difference D2.

In detail, the difference D2 may be obtained by using Equation 3 below.

$$D_2 = |G_{processed} - G_{original}|^2 \tag{3}$$

Here, G denotes image data of a green component.

Alternatively, when the difference D2 is obtained according to the blocks, the difference D2 may be obtained by squaring the pixel value differences of corresponding pixels, and then adding the squared pixel value differences with regards to the pixels in the blocks.

In operation S25, a boundary X corresponding to the sensitivity established in operation S21 is derived from the database formed by using the method of FIG. 1. The boundary X may be pre-derived.

Also, when the difference D2 is smaller than the boundary X, it is determined that the original image data includes noise components as the difference D2 is near to the boundary X. Accordingly, a first contribution of the original image data and a second contribution of the processed image data may be determined in such a way that the first contribution is decreased and the second contribution is increased. Alternatively, when the difference D2 is larger than the boundary X, it is determined that the original image data includes edge components instead of the noise components. Accordingly, the first and second contributions may be determined in such a way that the first contribution increases and the second contribution decreases as the difference D2 moves away from the boundary X. In other words, when the difference D2 is larger than the boundary X, the first contribution decreases and the second contribution increases as the difference D2 is near to the boundary X. As described above, the first contribution of the original image data and the second contribution of the processed image data are determined in operation S26.

In operation S27, the original image data and the processed image data are synthesized according to the determined first and second contributions. The synthesized original image data and processed image data may be stored.

Figure 8A:
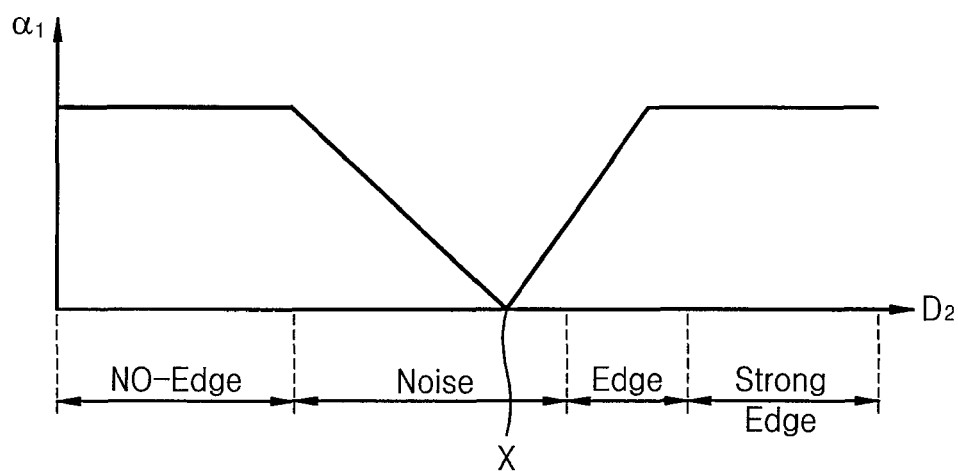

For example, the first contribution of the original image data may be determined as a graph illustrated in FIG. 8A. Then, the second contribution of the processed image data is automatically determined by fixing the sum of the first and second contributions to 1.

When the difference D2 is in an area before the boundary X, an image corresponding to the pixel or the block deriving the difference D2 may include a no-edge area, and when the difference D2 is in an area exceeding the boundary X, the image may include an edge area. Accordingly, when the difference D2 is equal to or below a first reference, the image may be determined as the no-edge area indicating an flat surface without an edge, and an area between the first reference and the boundary X may be determined as a noise area. The maximum of the noise area may be determined as the boundary X, but the noise area may be separated to include the boundary X, considering a margin. An area after the noise area may be determined as the edge area. When the edge area is equal to or above a second reference, the edge area may be determined to be a strong edge area. The first and second references may be determined based on rule-of-thumb.

Referring to FIG. 8A, the graph is divided into a no-edge area, a noise area, an edge area, and a strong edge area. The no-edge area and the strong edge area include only the original image data by determining the first contribution as 1, and the noise area and the edge area generate a synthesized image by suitably synthesizing the original image data and the processed image data.

In detail, in the noise area, as the difference D2 is near to the boundary X, the second contribution is increased, rather than the first contribution. When the difference D2 is near to the boundary X, the original image data includes the noise components, and thus, the noise components are removed by synthesizing the original image data and the processed image data after increasing a weight (the second contribution) of the processed image data on which noise filtering is performed with respect to the original image data. In other words, a weight (the first contribution) of the original image data is decreased.

Figure 8B:
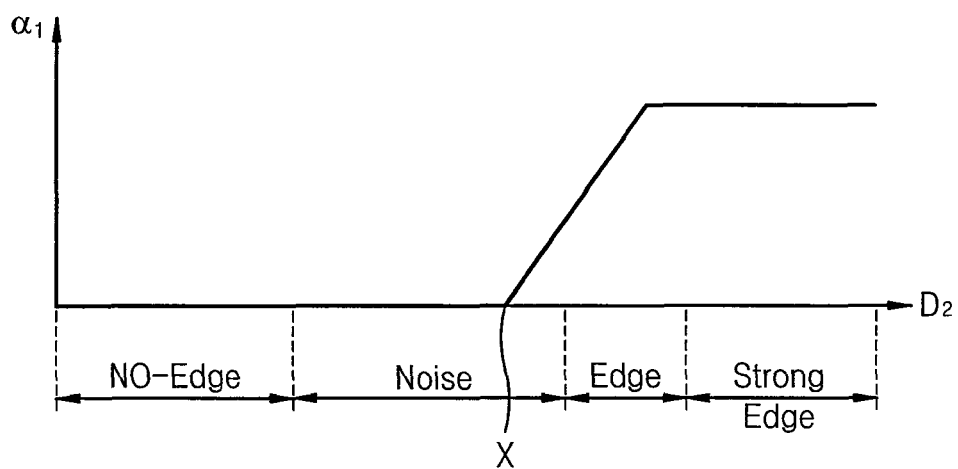

Alternatively referring to FIG. 8B, the second contribution may be larger than the first contribution in the no-edge area and the noise area wherein the difference D2 is smaller than the boundary X. For example, the second contribution may be set to 1, and the first contribution may be set to 0. Accordingly, only the processed image data can be used in an area wherein the difference D2 is smaller than the boundary X. Also, in an area wherein the difference D2 is larger than the boundary X, the first contribution may decrease and the second contribution may increase as the difference D2 is near to the boundary X as illustrated in FIG. 8A. As described above, the original image data and the processed image data are synthesized according to the determined first and second contributions.

Such a synthesis may be separately performed on each green red pixel (Gr), green blue pixel (Gb), red pixel (R), and blue pixel (B). Image synthesis for hand tremble correction may be shown as Equations 4 through 7. In other words, as described above, first contribution α1 of the original image data and the second contribution α2 of the processed image data are determined, and then, pixel values of a synthesized image may be obtained by substituting the determined first and second contributions α1 and α2 to Equations 4 through 7. Accordingly, the synthesized image is obtained and then stored.

$$Gr_{original} \times \alpha_1 + Gr_{processed} \times \alpha_2 = Gr' \text{ (here, } \alpha_1 + \alpha_2 = 1\text{)} \tag{4}$$

Here, $Gr_{original}$ denotes a green red pixel value of the original image data, $Gr_{processed}$ denotes a green red pixel value of the processed image data, and Gr' denotes a green red pixel value of synthesized image data.

$$Gb_{original} \times \alpha_1 + Gb_{processed} \times \alpha_2 = Gb' \text{ (here, } \alpha_1 + \alpha_2 = 1\text{)} \tag{5}$$

Here, $Gb_{original}$ denotes a green blue pixel value of the original image data, $Gb_{processed}$ denotes a green blue pixel value of the processed image data, and Gb' denotes a green blue pixel value of synthesized image data.

$$R_{original} \times \alpha_1 + R_{processed} \times \alpha_2 = R' \text{ (here, } \alpha_1 + \alpha_2 = 1\text{)} \tag{6}$$

Here, $R_{original}$ denotes a red pixel value of the original image data, $R_{processed}$ denotes a red pixel value of the processed image data, and R' denotes a red pixel value of synthesized image data.

$$B_{original} \times \alpha_1 + B_{processed} \times \alpha_2 = B' \text{ (here, } \alpha_1 + \alpha_2 = 1\text{)} \tag{7}$$

Here, $B_{original}$ denotes a blue pixel value of the original image data, $B_{processed}$ denotes a blue pixel value of the processed image data, and B' denotes a blue pixel value of synthesized image data.

The hand tremble correction is performed on the synthesized image obtained as above, by using the original image data generated by a capture signal. Accordingly, when a speed of processing an image signal for hand tremble correction is fast, the synthesized image in which hand tremble is effectively corrected is obtained.

An example of an apparatus for processing a digital image signal, according to an embodiment of the present invention, will now be described with reference to FIGS. 9 through 11.

Figure 9:
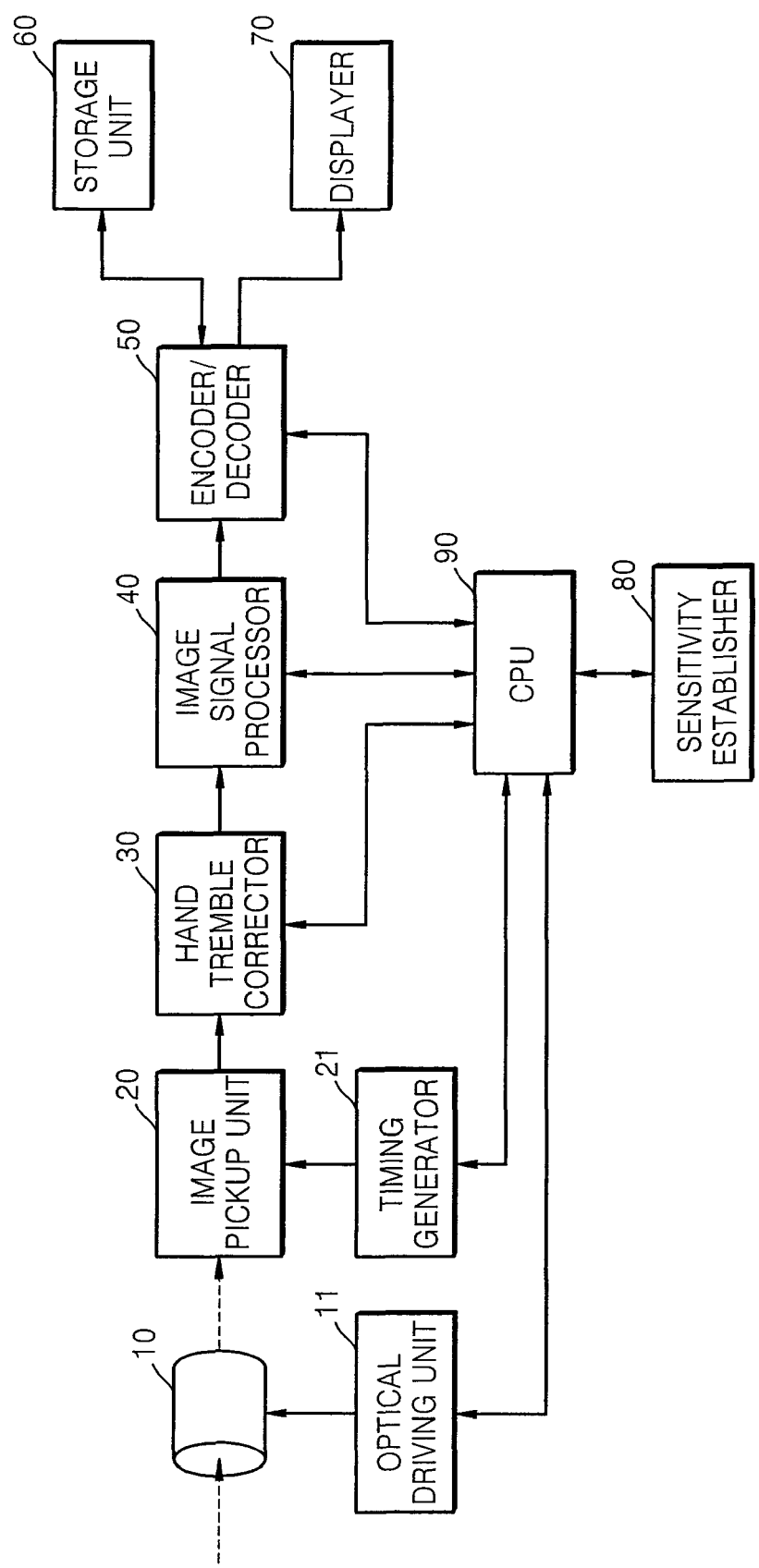
FIG. 9 is a block diagram illustrating an example of an apparatus for processing a digital image signal, according to an embodiment of the present invention.
Figure 10:
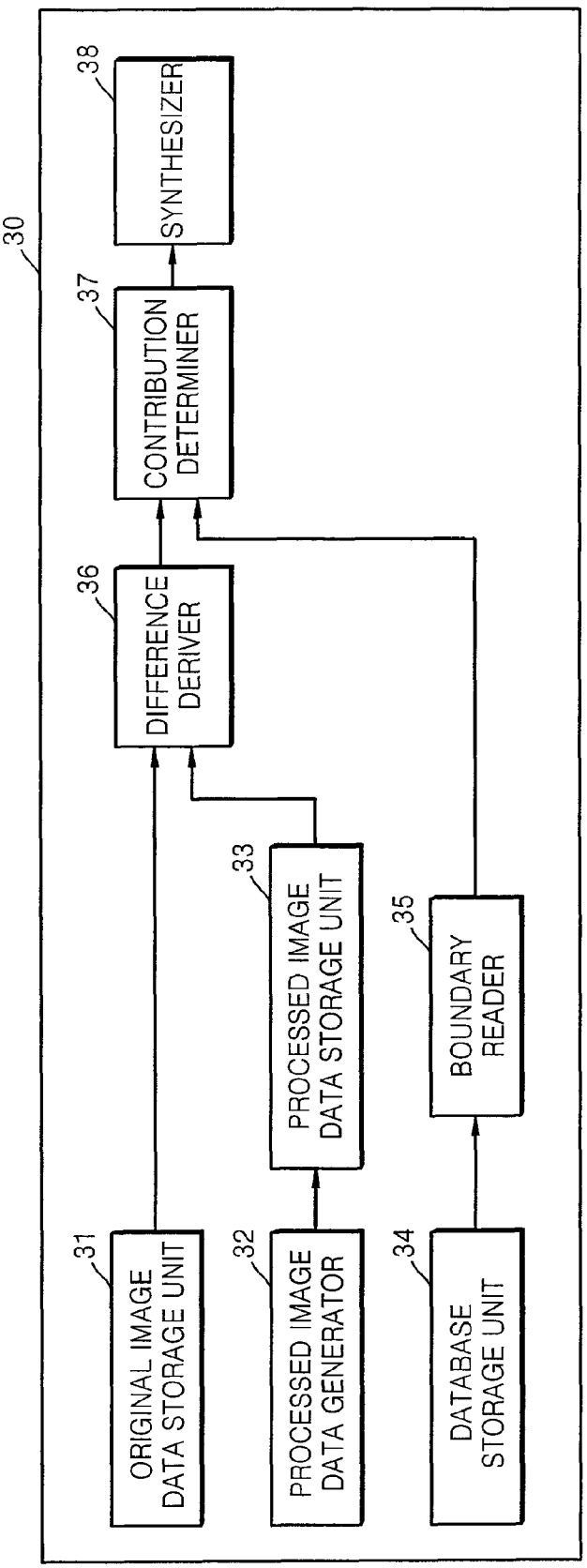
FIG. 10 is a block diagram illustrating an example of a hand tremble corrector of the apparatus illustrated in FIG. 9.

Referring to FIG. 9, an optical signal is transmitted to an image pickup unit 20 via an optical unit 10. The image pickup unit 20 converts the optical signal into an electric signal, and then, transmits the electric signal to a hand tremble corrector 30.

The optical unit 10 transmits the optical signal from an object to the image pickup unit 20. The optical unit 10 may include a lens (not shown) that concentrates the optical signal, an iris (not shown) that adjusts the amount of the optical signal (quantity of light), and a shutter (not shown) that controls an input of the optical signal. Also, the lens includes a zoom lens that adjusts a view angle according to a focal length, and a focus lens that adjusts a focus of the object. Also, the number of zoom lens and the focus lens may be at least one.

The optical unit 10 may be operated by an optical driving unit 11. For example, the optical driving unit 11 adjusts a location of the lens, opening/closing of the iris, and an operation of the shutter. The focus may be adjusted by moving the lens. Also, the quantity of light may be adjusted by adjusting the opening/closing of the iris or the shutter. The optical driving unit 11 receives image information received in real-time or input information of a user from a central processing unit (CPU) 90, and operates the optical unit 10 based on the received image information or input information.

The optical signal that is transmitted by the optical unit 10 forms an image of the object on a light-receiving surface of the image pickup unit 20. The image pickup unit 20 may use a charge coupled device (CCD) or a complementary metal oxide semiconductor image sensor (CIS) so as to convert the optical signal to the electric signal. A timing generator 21 controls the time of accumulating charges in the image pickup unit 20 or the time of outputting accumulated charges. Also, the timing generator 21 may be controlled by the CPU 90.

An image signal output from the image pickup unit 20 is transmitted to the hand tremble corrector 30. The hand tremble corrector 30 processes a signal for hand tremble correction by using Bayer raw data, on which an image signal process is not performed, in detail, on which gamma correction is not performed. Since the signal for hand tremble correction is performed on the Bay raw data having a low image signal level or noise level, noise is effectively removed even with a small Kernel size.

The hand tremble corrector 30 will now be described in detail with reference to FIG. 10. Referring to FIG. 10, original image data input from the image pickup unit 20 may be temporarily stored in an original image data storage unit 31. Also, a processed image data generator 32 generates processed image data by performing edge-preserving LPF on each of the 4 channels of the original image data. The processed image data generated by the processed image data generator 32 may be temporarily stored in a processed image data storage unit 33.

A difference deriver 36 derives a difference between the original image data and the processed image data. For example, the difference may be obtained by squaring pixel value differences of corresponding pixels of the original image data and the processed image data.

A contribution determiner 37 determines a first contribution and a second contribution by comparing the difference and a boundary. Before determining the first and second contributions, the contribution determiner 37 may determine a noise area. The noise area may be between the boundary and a first reference corresponding to a flat surface, i.e., a reference of a no-edge area. The maximum may be determined by considering a margin of the boundary with regards to the noise area. In the noise area, when the difference is near to the boundary, the first contribution of the original image data is decreased and the second contribution of the processed image data is increased.

The boundary may be read from a database storage unit 34 by a boundary reader 35, where the database storage unit 34 stores database about boundaries according sensitivity. The database may be pre-generated according to the method illustrated in FIG. 1. The boundary read by the boundary reader 35 is transmitted to the contribution determiner 37.

Figure 11:
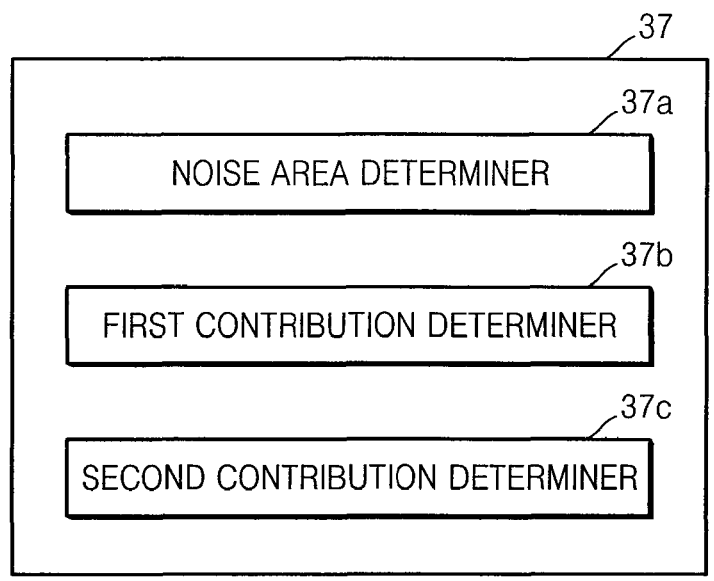
FIG. 11 is a block diagram illustrating an example of a contribution determiner of the hand tremble corrector illustrated in FIG. 10.

Referring to FIG. 11, the contribution determiner 37 may include a noise area determiner 37a which determines an area between the boundary and a first reference for determining a no-edge area as a noise area, a first contribution determiner 37b which determines a first contribution to decrease as the difference is near to the boundary, and a second contribution determiner 37c which determines a second contribution to increase as the difference is near to the boundary.

Referring back to FIG. 10, a synthesizer 38 generates synthesized image data by synthesizing the original image data and the processed image data according to the first and second contributions determined by the contribution determiner 37. Referring back to FIG. 9, the synthesized image data corrected by the hand tremble corrector 30 is transmitted to an image signal processor 40. The Bayer raw data stores a color value of only one channel from among R, Gr, Gb, and B, per pixel. Accordingly, color filter array interpolation is performed on the synthesized image data so that each pixel has an RGB value, and then a tone of each pixel is corrected via gamma correction. Alternatively, an image signal process, such as color matrix, color correction, color enhancement, etc., may be performed.

An encoder/decoder 50 generates an image file by compressing the synthesized image data on which the image signal process is performed, and stores the image file in a storage unit 60. Alternatively, the synthesized image data may be displayed on a displayer 70. Alternatively, the encoder/decoder 50 may restore the synthesized image data from the image file, and then, the displayer 70 may display the restored synthesized image data.

A sensitivity establisher 80 establishes sensitivity automatically or according to a selection signal of a user. The established sensitivity is transmitted to the boundary reader 35, and then, a boundary corresponding to the established sensitivity is derived from the database. The CPU 90 controls overall operations of the apparatus. The apparatus according to this embodiment performs the hand tremble correction with only one image, and specifically, performs the signal process for effective hand tremble correction by using the original image data (Bayer raw data) forming the image.

According to the embodiments of the present invention described herein, a processing time is reduced by performing hand tremble correction by using only one image. Also, the hand tremble correction according to the embodiments of the present invention is performed on original image data having a low image signal level or noise level, and thus, noise can be effectively removed only with a small kernel. In other words, the hand tremble correction is effectively performed.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of controlling an apparatus for processing a digital image signal, the method comprising:
    generating original image data;
    dividing the original image data into at least one block and generating processed image data in which an average of the original image data is calculated according to the block; and
    synthesizing the original image data having a first contribution and the processed image data having a second contribution, wherein the synthesizing comprises:
        decreasing the first contribution of the original image data or increasing the second contribution of the processed image data, as a difference of pixels or blocks between the original image data and the processed image data nears to a boundary value corresponding to a sensitivity that generated the original image data.

2. The method of claim 1, wherein the first contribution of the original image data is decreased and the second contribution of the processed image data is increased, as the difference of the original image data and the processed image data nears to the boundary value.

3. The method of claim 1, wherein the first contribution of the original image data is decreased and the second contribution of the processed image data is increased, when the difference of the original image data and the processed image data is larger than the boundary value and as the difference nears to the boundary value.

4. The method of claim 3, wherein when the difference is smaller than the boundary value, establishing the second contribution to be larger than the first contribution.

5. The method of claim 1, further comprising:
    inputting a capture signal; and
    generating the original image data by using the capture signal.

6. A method of controlling an apparatus for processing a digital image signal, the method comprising:
    generating original image data;
    dividing the original image data into at least one block and generating processed image data in which an average of the original image data is calculated according to the block;
    synthesizing the original image data having a first contribution and the processed image data having a second contribution, wherein the synthesizing comprises:
        decreasing the first contribution of the original image data or increasing the second contribution of the processed image data, as a difference of pixels or blocks between the original image data and the processed image data nears to a boundary value; and
    deriving the boundary value corresponding to a sensitivity that generated the original image data from a database of boundaries according to sensitivity.

7. The method of claim 6, further comprising:
generating first image data indicating a first image;
generating second image data indicating a second image inputted at the same sensitivity as a sensitivity that generated the first image data;
deriving a difference of pixels or blocks between the first image data and the second image data;
deriving a distribution of the difference;
deriving a boundary value of a certain confidence interval from the distribution of the difference; and
deriving the database of boundary values according to sensitivity by performing the above operations while differentiating a sensitivity.

8. The method of claim 7, wherein the boundary value is the maximum boundary of the certain confidence interval.

9. The method of claim 8, wherein in the database, the boundary value increases as the sensitivity increases.

10. A non-transitory computer readable recording medium having recorded thereon a program for controlling a computer to process a digital image signal by generating original image data, dividing the original image data into at least one block and generating processed image data in which an average of the original image data is calculated according to the block, and synthesizing the original image data having a first contribution and the processed image data having a second contribution, wherein the synthesizing comprises:
    decreasing the first contribution of the original image data or increasing the second contribution of the processed image data, as a difference of pixels or blocks between the original image data and the processed image data nears to a boundary value corresponding to a sensitivity that generated the original image data.

11. An apparatus for processing a digital image signal, the apparatus comprising:
    an original image data storage unit which stores original image data;
    a processed image data generator which divides the original image data into at least one block and generates processed image data in which an average of the original image data is calculated according to the block;
    a difference deriver which derives a difference of pixels or blocks between the original image data and the processed image data;
    a contribution determiner which determines a first contribution of the original image data or a second contribution of the processed image data by comparing the difference and a boundary value corresponding to a sensitivity that generated the original image data; and
    a synthesizer which synthesizes the original image data and the processed image data according to the determined first or second contribution.

12. The apparatus of claim 11, wherein the contribution determiner comprises a first distribution determiner which decreases the first contribution as the difference nears to the boundary value.

13. The apparatus of claim 11, wherein the contribution determiner comprises a second distribution determiner which increases the second contribution as the difference nears to the boundary value.

14. The apparatus of claim 11, wherein when the difference is larger than the boundary value, the contribution determiner comprises a first contribution determiner which decreases the first contribution as the difference nears to the boundary value, and a second contribution determiner which increases the second contribution as the difference nears to the boundary value.

15. The apparatus of claim 11, wherein when the difference is smaller than the boundary value, the contribution determiner establishes the second contribution to be larger than the first contribution.

16. An apparatus for processing a digital image signal, the apparatus comprising:
   an original image data storage unit which stores original image data;
   a processed image data generator which divides the original image data into at least one block and generates processed image data in which an average of the original image data is calculated according to the block;
   a difference deriver which derives a difference of pixels or blocks between the original image data and the processed image data;
   a contribution determiner which determines a first contribution of the original image data or a second contribution of the processed image data by comparing the difference and a boundary value corresponding to a sensitivity that generated the original image data;
   a synthesizer which synthesizes the original image data and the processed image data according to the determined first or second contribution; and
   a database storage unit which stores database of boundary values according to sensitivity.

17. The apparatus of claim 16, further comprising a boundary reader which reads a boundary value, corresponding to established sensitivity, from the database.

18. The apparatus of claim 16, wherein the database is formed by deriving a distribution of a difference of pixels or blocks between first image data indicating a first image and second image data indicating a second image inputted at the same sensitivity as the sensitivity that generated the first image data, and differentiating sensitivity while deriving a boundary value of a certain confidence interval from the distribution.

19. The apparatus of claim 18, wherein the boundary value is the maximum boundary of the certain confidence interval.

20. The apparatus of claim 18, wherein in the database, the boundary value increases as sensitivity increases.

* * * * *